No. 782,746. Patented February 14, 1905.

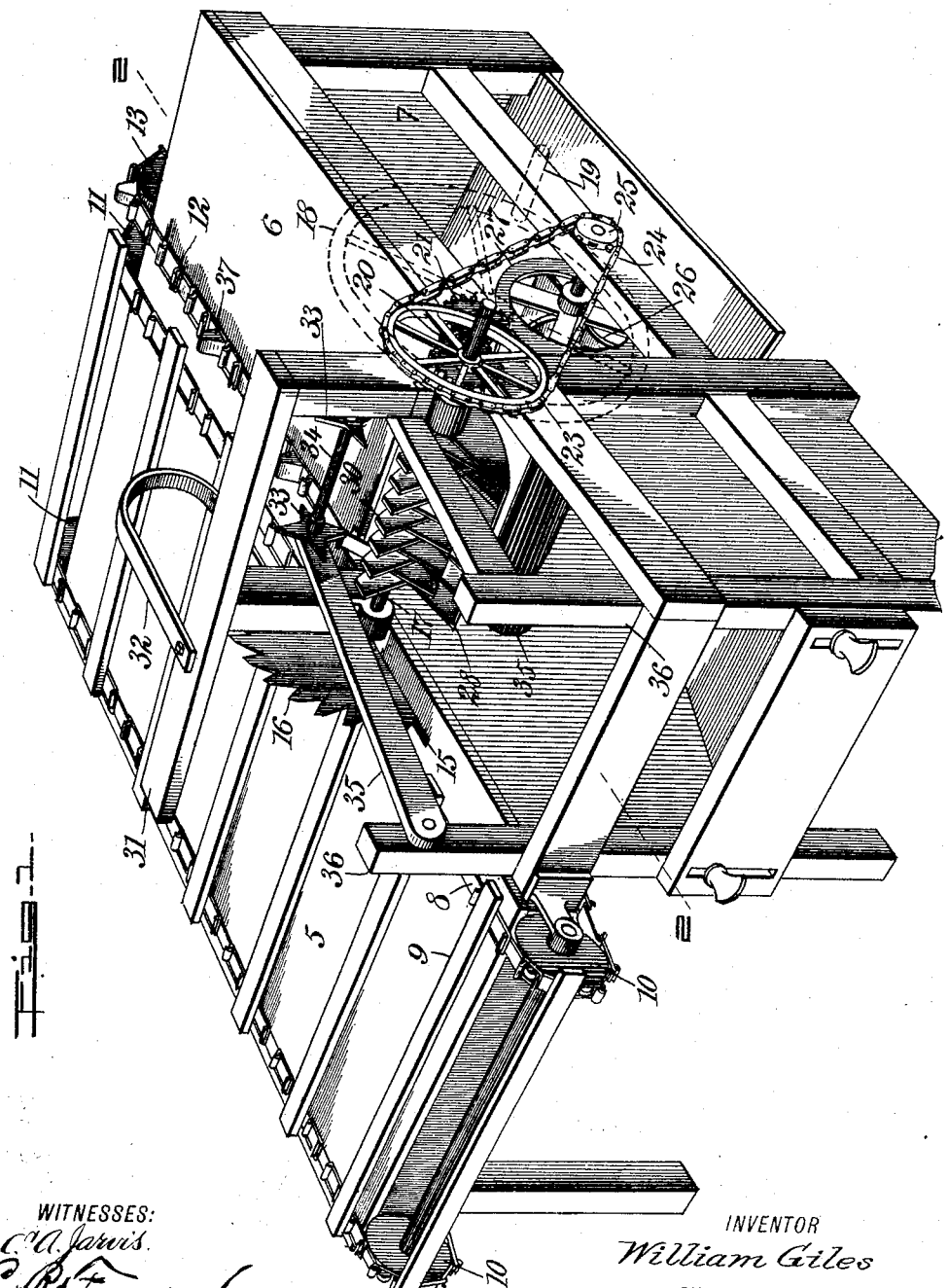

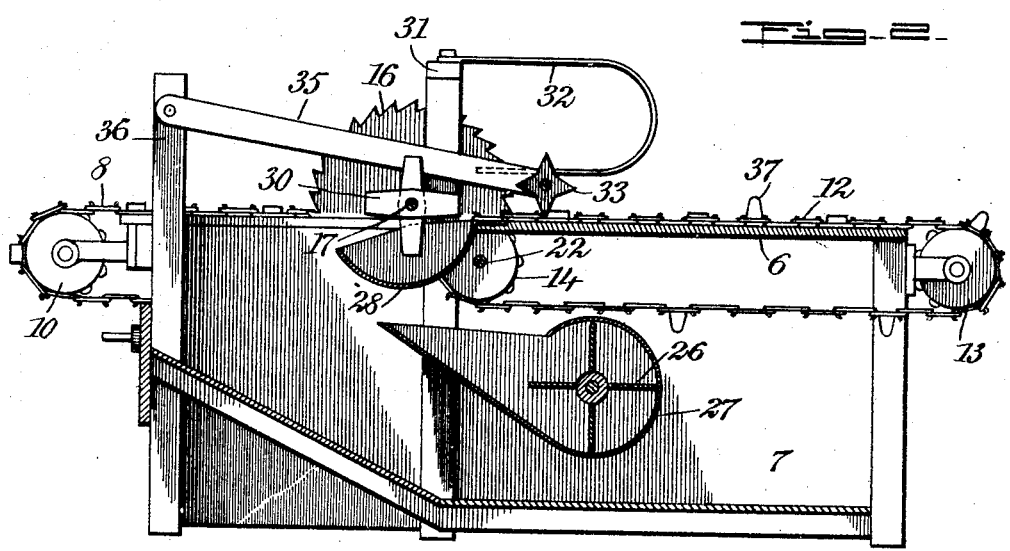
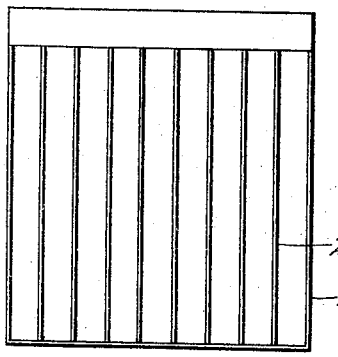
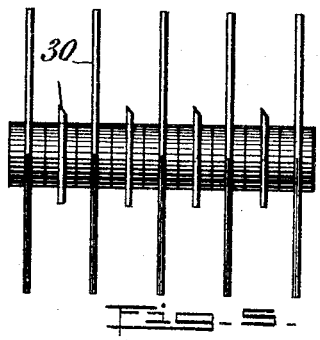
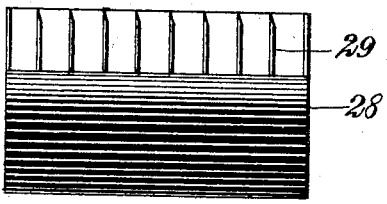

UNITED STATES PATENT OFFICE.

WILLIAM GILES, OF AMARILLO, TEXAS.

HEADER AND SHREDDER.

SPECIFICATION forming part of Letters Patent No. 782,746, dated February 14, 1905.

Application filed May 28, 1904. Serial No. 210,185.

*To all whom it may concern:*

Be it known that I, WILLIAM GILES, a citizen of the United States, and a resident of Amarillo, in the county of Potter and State of Texas, have invented a new and Improved Header and Shredder, of which the following is a full, clear, and exact description.

This invention relates to improvements in machines for heading and shredding Kafir corn, Milo maize, cane, wheat, and other grain, the object being to provide a machine of this character that may be operated with comparatively little power and that will effectually separate the grain from the stalks without tearing or breaking the bundles.

I will describe a header and shredder embodying my invention and then point out the novel features in the appended claims.

Reference is to be had to the accompanying drawings, forming a part of this specification, in which similar characters of reference indicate corresponding parts in all the figures.

Figure 1 is a perspective view of a header and shredder embodying my invention. Fig. 2 is a section on the line 2 2 of Fig. 1. Fig. 3 is a plan view of a shredder-tray employed, and Fig. 4 is a front view thereof, and Fig. 5 shows the shredder-head.

The frame of the machine comprises a table 5, on which the bundles are movable, and a table 6, on which the heads are moved and separated. Underneath the table 6 is a casing 7 for receiving the grain or heads. Movable over the table 5 is an endless carrier comprising chains 8, to which are attached slats 9. The chains 8 pass over sprocket-wheels 10 at one end of the table and sprocket-wheels 11 at the other end.

Movable over the table 6 adjacent to the table 5 is a carrier comprising an endless chain 12, which engages with a sprocket-wheel 13 at the rear end of the table and with a sprocket-wheel 14 near the center, and the shaft of the sprocket-wheel 13 connects with or, in other words, is an extension of the shaft of the sprocket-wheels 11.

Extended through a slot 15 in the table 5 is a severing-knife (here shown as a saw 16) connected to a shaft 17, on the outer end of which is a driving-wheel 18, having a handle 19, by means of which the device may be manually operated; but it is to be understood it may be driven by any desired power.

On the shaft 17 is a pinion 20, meshing with a pinion 21 on the shaft 22 of the sprocket-wheel 14, and also on this shaft 17 is a sprocket-wheel 23, having a chain connection 24 with a sprocket-pinion 25 on the shaft of a blower or fan 26, operating in a boxing 27, arranged in the casing 7, this boxing being open at the top, so that the fine chaff, dust, or dirt is thrown upward and out of the open upper end of the casing 7 by the operation of the fan.

Arranged above the boxing 27 is a header-tray 28, divided into a number of compartments by partitions 29, and on the shaft 17 are header-blades 30, which may be sharpened or beveled from one side to the other at the edges or may be otherwise sharpened, as conditions may require. These blades are arranged in pairs, one blade crossing the other, and each pair operates in a compartment of the tray 28.

Attached to a bar 31, extended over the table 5, is a guide or presser bar 32 for forcing the bundle of material downward as it moves toward the cutter 16.

Mounted to swing above the table 6 adjacent to the header 30 are star-wheels 33, mounted on a shaft 34, having bearings in arms 35, arranged to swing on legs or posts 36. These star-wheels are designed to press the severed heads downward on the table and to slightly separate the same before reaching the header 30.

In the operation the bundle of material is to be placed on the endless carrier traveling over the table 5 with the head portion on the endless carrier 12, which, as will be noted, has lugs 37 to form carrier-fingers. Upon reaching the saw 16 the head portions of the material will be severed from the main body, and the grain will be thoroughly threshed out by the header 30, operating in the tray 28. The light material—such as chaff, dirt, and the like—as before mentioned, will be forced upward and outward by the rotary motion of the fan, and the grain will fall into the boxing or casing 7.

Having thus described my invention, I claim as new and desire to secure by Letters Patent—

1. In a header and shredder, the combination with the shredder mechanism, of a table in which the same is arranged, an endless carrier on said table, a table adjacent to the first-named table, an endless carrier movable over the last-named table, a presser-bar over the last-named carrier, and a saw operating between the two carriers.

2. In a header and shredder, the combination with the shredder mechanism, of an endless carrier-chain, fingers on said chain, an endless carrier at one side of the first-named carrier, a presser-bar over the last-named carrier, and a rotary cutter between the carriers.

In testimony whereof I have signed my name to this specification in the presence of two subscribing witnesses.

WILLIAM GILES.

Witnesses:
 CHAS. J. E. LOWNDES,
 J. S. CHESNUTT.